United States Patent
Hsiung et al.

(10) Patent No.: US 9,906,557 B2
(45) Date of Patent: Feb. 27, 2018

(54) DYNAMICALLY GENERATING A PACKET INSPECTION POLICY FOR A POLICY ENFORCEMENT POINT IN A CENTRALIZED MANAGEMENT ENVIRONMENT

(71) Applicant: International Business Machines Corporation, Armonk, NY (US)

(72) Inventors: Wei-Hsiang Hsiung, Taipei (TW); Sheng-Tung Hsu, Taipei (TW); Cheng-Ta Lee, Taipei (TW); Ming-Hsun Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 14/744,385

(22) Filed: Jun. 19, 2015

(65) Prior Publication Data
US 2015/0381660 A1    Dec. 31, 2015

(30) Foreign Application Priority Data

Jun. 30, 2014  (TW) .............................. 103122608 A (51) Int. Cl.
*H04L 29/06* (2006.01)
*H04L 12/24* (2006.01)
*H04L 12/26* (2006.01)

(52) U.S. Cl.
CPC .......... *H04L 63/20* (2013.01); *H04L 41/0816* (2013.01); *H04L 41/0893* (2013.01);
(Continued)

(58) Field of Classification Search
CPC ......... H04L 29/06; H04L 41/12; H04L 43/04; H04L 43/16; H04L 45/00; H04L 45/02;
(Continued)

(56) References Cited

U.S. PATENT DOCUMENTS

| 7,965,636 B2 | 6/2011 | Gooch et al. |
| 8,102,854 B2 | 1/2012 | Singh et al. |

(Continued)

OTHER PUBLICATIONS

"Accelerated Deep Packet Inspection for Network Security Applications", Wind River Systems, Inc., http://www.windriver.com/whitepapers/deep-packet-inspection/Content_Inspection_Engine_WP.pdf, Sep. 12, 2012, 7 Pages.

(Continued)

*Primary Examiner* — Joseph P Hirl
*Assistant Examiner* — Kalish Bell
(74) *Attorney, Agent, or Firm* — Francis Lammes; Stephen J. Walder, Jr.; Jeffrey S. LaBaw (57) ABSTRACT

A mechanism is provided for generating a packet inspection policy for a policy enforcement point in a centralized management environment. Data of a network topology for the policy enforcement point corresponding to a network infrastructure is updated according to metadata of the policy enforcement point, the metadata including a capability of the policy enforcement point. The packet inspection policy for the policy enforcement point is generated according to the data of the network topology and the capability of the policy enforcement point. The packet inspection policy is then deployed to the policy enforcement point.

20 Claims, 9 Drawing Sheets

(52) U.S. Cl.
CPC ............ *H04L 41/12* (2013.01); *H04L 43/028* (2013.01); *H04L 63/0263* (2013.01); *H04L 43/0817* (2013.01); *H04L 43/10* (2013.01); *H04L 63/14* (2013.01)

(58) Field of Classification Search
CPC ......... H04L 45/22; H04L 49/15; H04L 63/00; H04L 63/14; H04L 63/20; H04L 67/10
USPC .............................................. 726/1–3, 22–27
See application file for complete search history.

(56) References Cited

U.S. PATENT DOCUMENTS

| | | |
|---|---|---|
| 8,112,622 B2 | 2/2012 | Qi |
| 8,443,440 B2 | 5/2013 | McGee |
| 8,606,921 B2 | 12/2013 | Vasquez et al. |
| 9,282,027 B1 * | 3/2016 | Brandwine ............. H04L 45/04 |
| 2007/0226807 A1 * | 9/2007 | Ginter .................... G06F 21/10 726/27 |
| 2007/0300298 A1 * | 12/2007 | Goranson ........... H04L 63/1416 726/22 |
| 2010/0142371 A1 * | 6/2010 | Gooch .................. H04L 43/026 370/229 |
| 2011/0099631 A1 | 4/2011 | Willebeek-LeMair et al. |
| 2012/0102563 A1 | 4/2012 | Kim |
| 2013/0291088 A1 | 10/2013 | Shieh et al. |
| 2013/0346987 A1 | 12/2013 | Raney et al. |

OTHER PUBLICATIONS

Yan, Guanhua et al., "Dynamic Balancing of Packet Filtering Workloads on Distributed Firewalls", 16th International Workshop on Quality of Service, IWQoS 2008, http://cs.gmu.edu/~sqchen/publications/IWQoS2008-distributed-firewall.pdf, Jun. 2-4, 2008, 10 pages.

* cited by examiner

Policy Enforcement Point A:

| Rule | Destination IP | Action |
|---|---|---|
| 1 | 10.40.24.56 | Forward |
| 2 | 10.40.24.99 | Only inspect the HTTPS traffic packet |
| 3 | 10.40.24.123 | Forward |

Policy Enforcement Point B:

| Rule | Destination IP | Action |
|---|---|---|
| 1 | 10.40.24.56 | Inspect |
| 2 | 10.40.24.99 | Only forward the HTTPS traffic packet |
| 3 | 10.40.24.123 | Inspect |

FIG.7

DYNAMICALLY GENERATING A PACKET INSPECTION POLICY FOR A POLICY ENFORCEMENT POINT IN A CENTRALIZED MANAGEMENT ENVIRONMENT

BACKGROUND

The present invention relates to a dynamic synchronization mechanism, provided between security agents or between security appliances, to share a load and capability of information, particularly to generating a packet inspection policy for each policy enforcement point in a centralized management environment according to data of a network topology in a network infrastructure and capability of each policy enforcement point; and a method, an appliance, and a computer program product which dynamically adjusts the packet inspection policy of each policy enforcement point according to the capability of each policy enforcement point, metadata, and running status of each policy enforcement point.

Network security operation has been an important issue in the field of network technology, such as Data Loss Prevention (DLP), Secure Sockets Layer (SSL) Inspection, Firewall (FW), Malware detection, intrusion detection system (IDS) or intrusion prevention system (IPS), but it is known to those skilled in the art that the technology is not limited thereto. Security technology generally involves inspection of a traffic packet, and the packet inspection is usually very dependent on resources.

For appliances with relatively low computing ability, a comprehensive packet inspection represents a resource hog. Therefore, only critical inspections are performed on such appliances. For appliances which cannot perform packet inspection (e.g. mobile appliance), packet inspection can only be performed by devices set on packet routes, e.g. performed by a network security device on a packet route. However, there may not be only one network security device on the packet route. Thus, packets may be inspected repeatedly, and the system performance is impacted.

Figure 1A:
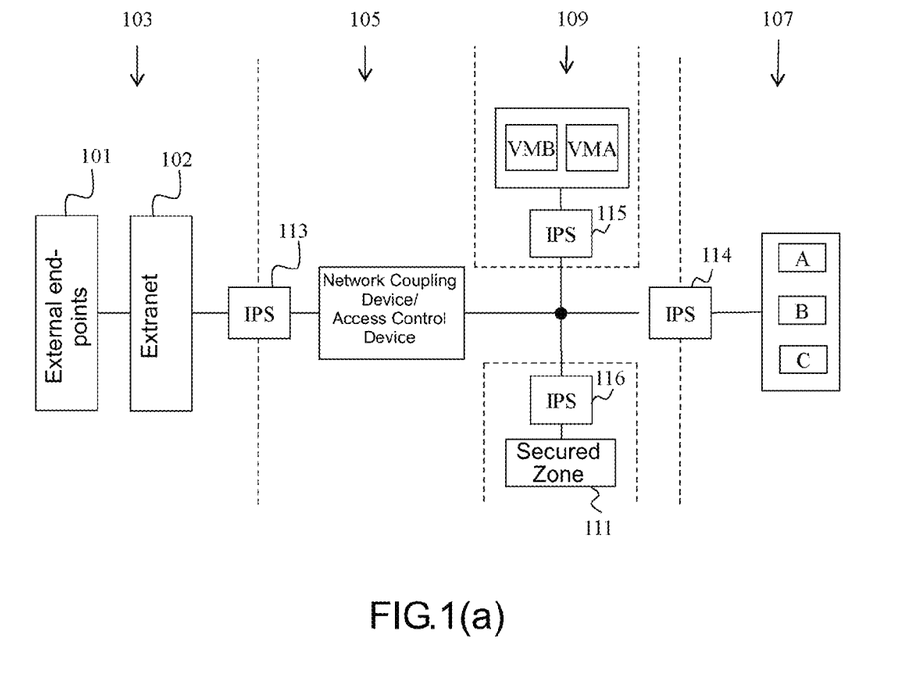
FIG. 1(a) is a schematic diagram of a conventional network infrastructure.

FIG. 1(a) is a schematic diagram of a conventional network infrastructure. In an uncontrolled zone 103 the user of external end-points 101 via the extranet 102 enters a network coupling device 106 served as a demilitarized zone (DMZ) 105 of an intranet. The network coupling device 106 may be a device capable of controlling the flow of network packets, such as a switch, a bridge, or a router. The demilitarized zone (DMZ) 105 is also provided as a buffer between an uncontrolled zone and the intranet. Access control can be deployed in the demilitarized zone (DMZ) 105 to control and monitor the resources of the other controlled zone (e.g. intranet resources 107 used as the resources of the intranet) or restricted zone 109.

The restricted zone 109 supports the function of strict access control. In general, the restricted zone cannot be directly accessed by an uncontrolled zone, and can substantially be bounded by one or more firewalls (FW) which filters input and output traffic. For example, the restricted zone may comprise a hypervisor, such as a VMware ESX hypervisor, with a virtual server protection (VSP) generally installed, e.g. IBM ISS VSP, to protect the virtual machine being executed.

The access to the secured zone 111 is tightly controlled. The zone can only be accessed by a small number of authorized users. For example, the zone may comprise an IBM Security SiteProtector™ System which is a centralized management system providing a consistent management and analysis of servers, appliances, and security agents in the network infrastructure. More information about the SiteProtector™, can found within the IBM Security SiteProtector™ System V3.1.0 documentation at IBM's Knowledge Center website.

More information related to the network infrastructure may be referred to IBM Redbooks Web site Enterprise, "Security Architecture using IBM Tivoli Security Solutions, SG24-6014".

The architecture of the network coupling device 106 may be referred to Cisco's switch product, Cisco Catalyst 3550 Series Switch. The intranet resources 107 are not limited to specific appliances or servers, and each of the intranet resources 107 may contain an unlimited number of appliance or server or a combination thereof For example, the intranet resources 107 may represent a local area network (LAN). Such appliances, also commonly known as Internet appliances, are devices with network capability and certain specific functions. Contrary to the general-purpose computer apparatus, the appliances have relatively higher performance since they are generally designed in accordance with specific purposes or specific services for a particular transaction.

The intranet resources 107 may be a virtual local area network (VLAN). For the internal resources of the business or organization, through a virtual LAN technology, different physical LAN devices can be logically grouped by administrator, and more complete information security can be provided.

In another aspect, to ensure the security of internal data, the general corporation or organization may use the virtual private network (VPN) and thus provide a VPN server in the demilitarized zone (DMZ) 105 for users to access internal resources from external connections. Examples can be referred to the technical documents published on the applicant's official website, WebSphere Everyplace Connection Manager: increasing mobile security, reducing wireless costs. The VPN server is coupled to a network coupling device 106. The user of the external end-point 101 has to register on the virtual private network server. After authentication and authorization, the network coupling device 106 can be connected through the VPN. It should be noted that, the VPN server may not be necessary in some embodiments. That is, the user of external end-points 101 does not have to connect the network coupling device 106 and the intranet resources 107 through the virtual private network VPN. It should be noted that although not illustrated, any other hardware and software component (e.g. an additional computer system, router, firewall (FW)) may be configured in the Internet 103 between the VPN server (or the network coupling device 106) and the external end-points 101.

More information may be referred to technical documents published by Andrew Jones et al. on the applicant's official website, IBM SmartCloud Enterprise tip: Build multiple VPNs and VLANs: VPN and VLAN features and capabilities in IBM SmartCloud Enterprise 2.0 and IBM SmartCloud Enterprise tip: Span virtual local area networks Provision and configure an instance that spans a public and private VLAN.

Administrators are normally unable to determine whether a traffic packet from another network segment has been inspected or not, and unknowing whether the other security agent or security appliance has capability, like decryption of Secure Sockets Layer (SSL) required by HTTPS protocol, to inspect the received traffic packet or not. In general corporations or organizations, to ensure the security of network communications and internal data, the intranet network security policies are provided on the internal end-points linked to intranet. Such intranet network security policies are security agents like firewall (FW), anti-virus software, intrusion detection system (IDS) or intrusion prevention system (IPS). The internal end-point may be a host computer (e.g. a router, workstation, or server), or a data circuit-terminal equipment (DCE) (e.g. a bridge or a switch). In practical, normally for the sake of security, to install a security agent, such as PSL (Linux), PSU (UNIX), and PSW (Windows), on a machine is required no matter the machine is physical or virtual.

In addition, sometimes a security agent may not be installed on each machine. Therefore, in view of network security, to set up security appliances at an edge of each zone in the network infrastructure is necessary. In the network infrastructure as shown in FIG. 1(a), a plurality of network security appliances 113-116 (e.g. firewall (FW), intrusion detection system (IDS), or intrusion prevention system (IPS)) are usually deployed at the junction of each zone, i.e. the edge of each zone.

Figure 1B:
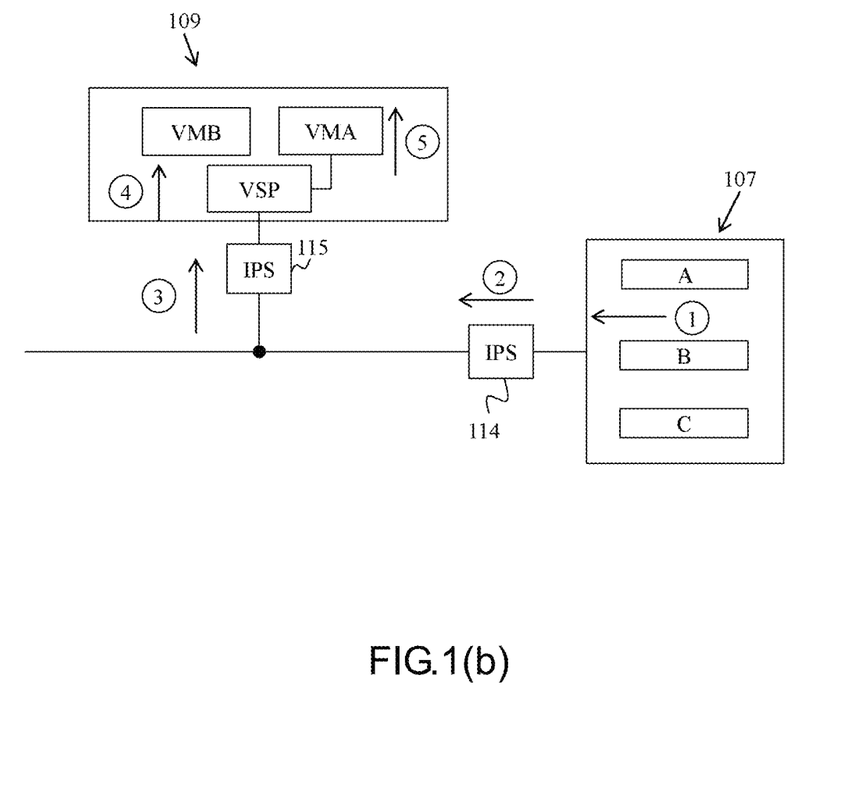
FIG. 1(b) illustrates a conventional intranet file sharing service.
Figure 1C:
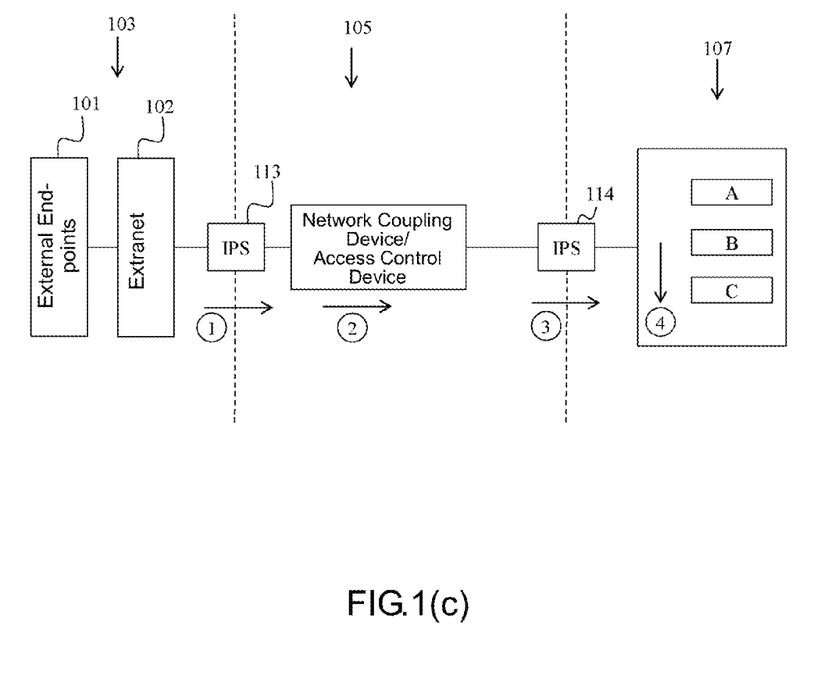
FIG. 1(c) illustrates a conventional public internet access from intranet operation.

In the network infrastructure as shown in FIG. 1(a), the packet route may involve repeated operations for packet inspection in connection to multiple security agents or security appliances, such as the intranet file sharing service as shown in FIG. 1(b) and the public internet access from intranet operation as shown in FIG. 1(c).

In the intranet file sharing service as shown in FIG. 1(b), the administrator sets a virtual machine to perform file sharing services at VMA within the restricted zone 109. When the end-point B in the intranet needs to access the file sharing services, the packet sent by the end-point B will be inspected five times, that is:

1. Inspected by a security agent installed at the end-point B;
2. Inspected by the intrusion prevention system (IPS) 114 in an edge of the intranet resources 107;
3. Inspected by the intrusion prevention system (IPS) 115 in an edge of the restricted zone 109;
4. Inspected by a virtual server protection (VSP) installed in a hypervisor, e.g. VMware ESX hypervisor to protect a virtual machine; and
5. Inspected by a security agent executed in the VMA.

In the public internet access from intranet operation as shown in FIG. 1(c), the administrator sets a proxy server in the demilitarized zone (DMZ) 105. When an end-point C in the intranet needs to download a file from Dropbox in the uncontrolled zone 103, the packet sent by the Dropbox to the end-point C will be inspected four times, that is:

1. Inspected by the intrusion prevention system (IPS) 113 in an edge of the uncontrolled zone 103;
2. Inspected by the security agent in the demilitarized zone (DMZ) 105, which protects the proxy server;
3. Inspected by the intrusion prevention system (IPS) 114 in an edge of the intranet resources 107; and
4. Inspected by the security agent installed at the end-point C.

As seen from the aforementioned embodiments, each security agent or security appliance in the physical network usually repeatedly inspects packets due to incapability to share the load and the capability of information, for example, lacking of the previous processing status about the received traffic packet that has been inspected and sent by a security agent or a security appliance within other network segments, and/or lacking of the capability to inspect the received traffic packet. Thus the system resources are wasted, resulting in the deterioration of the overall performance of the network infrastructure. The security agent or security appliance can be referred as a policy enforcement point.

In addition, each policy enforcement point is usually in a predetermined static configuration to provide a packet inspection policy for each policy enforcement point. The policy enforcement point in static configuration fails to dynamically adjust its configuration (i.e. packet inspection policies) in response to the load changes of each policy enforcement point in the network infrastructure for optimizing the overall performance of the network infrastructure.

Therefore, it is advantageous to provide a dynamic synchronization mechanism between each policy enforcement point (security agent or security appliance) to share information of load and capability, and overcome the conventional shortcomings of repeatedly inspecting packets and incapability to dynamically adjust the configuration of each policy enforcement point.

SUMMARY

The present invention provides a centralized management system to generate packet inspection policies for each policy enforcement point according to data of network topology in the network infrastructure and capability of each policy enforcement point (e.g. packet inspection capability, processor capability for each policy enforcement point and bandwidth), and to dynamically adjust the packet inspection policies for each policy enforcement point according to the capability, metadata, and the running status (e.g. the current load, health information, etc.) of each policy enforcement point.

In one illustrative embodiment, a method is provided for generating a packet inspection policy for a policy enforcement point in a centralized management environment. The illustrative embodiment updates data of a network topology for the policy enforcement point corresponding to a network infrastructure according to metadata of the policy enforcement point, the metadata including a capability of the policy enforcement point. The illustrative embodiment generates the packet inspection policy for the policy enforcement point according to the data of the network topology and the capability of the policy enforcement point. The illustrative embodiment deploys the packet inspection policy to the policy enforcement point.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Citation of "an embodiment" or a similar expression in the specification means that specific features, structures, or characteristics described in the embodiment are included in at least one embodiment of the present invention. Hence, the wording "in an embodiment" or a similar expression in this specification does not necessarily refer to the same embodiment.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 2 to FIG. 7 show a flowchart and a block diagram of a practical architecture, functions and operations of a system, a method and a computer program product according to embodiments of the present invention. Each block in the flowchart or block diagram may represent a module, a segment or a part of a program code, and may include one or more executable instructions to perform a designated logic function. It should be noted that, in other embodiments, the functions depicted by the blocks may be performed in a sequence other than that shown in the figures. For example, two connected blocks in each figure may both be performed, or, with certain functions involved or under certain circumstances, may be performed in a reverse sequence of the sequence shown in each figure. It should be also noted that, each block in each block diagram and/or each flowchart, and combinations of the blocks in each block diagram and/or each flowchart, may be implemented on the basis of a hardware system for a specific purpose or perform specific functions or operations by means of the combination of hardware and computer instructions for a specific purpose.

<Hardware Environment>

Figure 2:
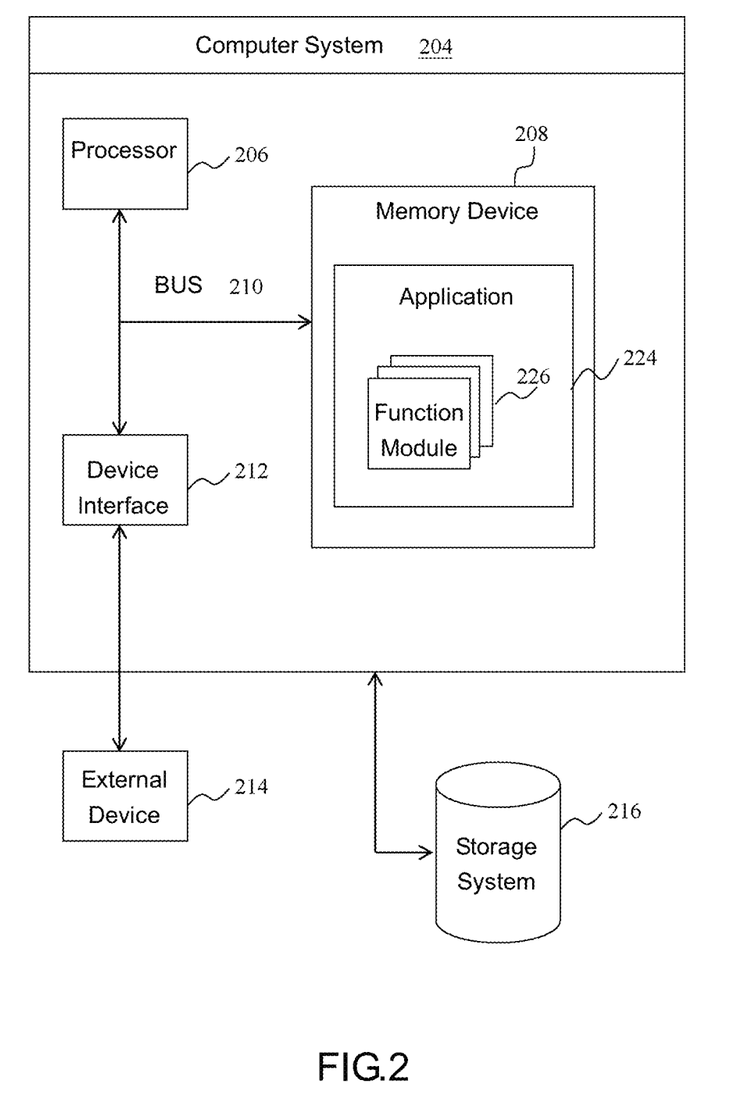
FIG. 2 is a hardware architecture diagram of a computer system according to an embodiment.

FIG. 2 is a hardware architecture diagram of a computer system 204 according to an embodiment. The computer system 204 may be implemented as having a centralized management system of the present invention, or implemented as having a policy enforcement point (security agent or security appliance) of the present invention. The computer system 204 comprises a processor 206, a memory device 208, a bus 210, and a device interface 212. The processor 206 is used to access the memory device 208 or program code in an external storage device 216, e.g. program 224. The program 224 comprises one or multiple function modules 226 used to provide required functionality for the present invention (this will be described in conjunction with FIGS. 3 to 5 hereinafter), e.g. a packet inspection policy generating module 300 and a packet inspection policy adjustment module 400 in a centralized management system, or a packet security tag inspection module 500 of a policy enforcement point. The function module 226 may be a single instruction or a plurality of instructions and can be distributed on several different code segments, different programs, and a number of memory devices 208.

The bus 210 provides a communication link between each component in the computer system 204. Also, the computer system 204 is communicatively-linked with an external device 214 through the device interface 212. Furthermore, the computer system 204 can be communicated with the external device 214, an external storage device 216, or any other computer apparatus/system via the Internet. Herein, the Internet can also be implemented as any type of connections, including the fixed local area network (LAN) connection or wide area network (WAN) connection, or temporarily dialing to the Internet using the Internet service provider, which is not limited to wired or wireless connections. However, it should be understood that although not shown, any other hardware and software component (e.g. additional computer system, router, firewall (FW)) may be comprised in the said Internet.

In other embodiments, the basic architecture and components of the computer system 204 may be implemented as a general purpose computer apparatus, e.g. a personal computer (PC) or a server, or an appliance such as: IBM WebSphere Datapower SOA Appliance or Tivoli ISS Appliance ("IBM", "WebSphere" and "Tivoli" are registered trademarks of International Business Machine Corporation in the US and/or other countries).

Hereinafter, the present invention will be described with reference to embodiments. Nevertheless, it is comprehended by those skilled in the art that the present invention is not limited thereto.

<Packet Inspection Policy Generating Module>

Figure 3:
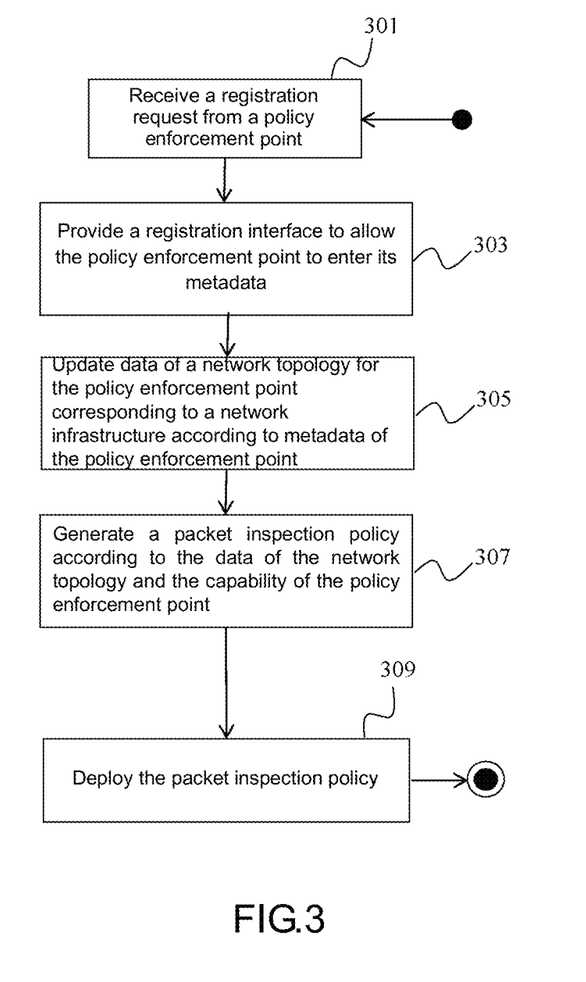
FIG. 3 is a flowchart showing a method of a packet inspection policy generating module according to an embodiment of the present invention.

FIG. 3 is a flowchart showing a method of a packet inspection policy generating module according to an embodiment of the present invention. The generating module comprises an application module and instructions for a centralized management system (e.g. IBM Security SiteProtector™ System configured in the secured zonell as shown in FIG. 1(a)) to receive a register from a policy enforcement point and generate a packet inspection policy for the policy enforcement point.

Step 301: receiving a register request from a policy enforcement point by a centralized management system.

Step 303: providing a registration interface by the centralized management system to allow the policy enforcement point to provide its metadata in response to the request. The metadata may comprise the capability of the policy enforcement point (e.g. the packet inspection capability, the processor capability for the policy enforcement point and the bandwidth), and sequence related to other policy enforcement point or other metadata.

Step 305: determining the position of the newly added policy enforcement point in the network infrastructure according to the metadata of the newly added policy enforcement point (capability, etc.), so as to update the data of network topology for the policy enforcement point corresponding to the network infrastructure. More related information about network topology and its infrastructure may be found on the Network Topology portion of the Wikipedia website.

Step 307: generating a packet inspection policy for the policy enforcement point according to the data of the network topology and capability of the policy enforcement point. The centralized management system may generate packet inspection policies for a policy enforcement point according to one or multiple generating criteria in combination with the data of network topology and capability of the policy enforcement point.

For example, the criteria comprise: if the security mechanism "does not exist" in all the other policy enforcement points within network segments authorized by the policy enforcement point with the packet inspection capability of a specific security mechanism, the inspection through the security mechanism is performed. As for all the policy enforcement points "with" the security mechanism, their inspection policies can be determined according to their capability.

Furthermore, the criteria may also comprise: if a policy enforcement point which performs a specific security mechanism (e.g. DLP, IDS, IPS or FW) exists on the end-point of the packet route, only the security mechanism of the end-point inspects the packet, and all other policy enforcement points whose destination is the end-point shall not use the security mechanism to inspect the packet. The packet inspection policy for the policy enforcement point is not limited to the aforementioned manner.

Figure 7:
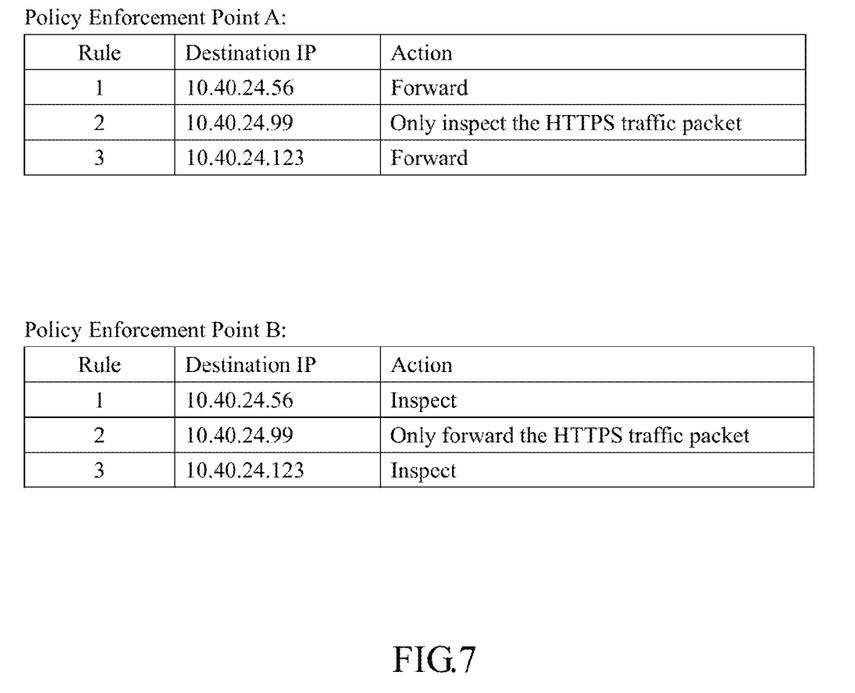
FIG. 7 illustrates packet inspection policies according to an embodiment.

The policy enforcement point determines whether to inspect the currently received packet or not according to the packet inspection policy received from the centralized management system. FIG. 7 illustrates packet inspection policies according to an embodiment. FIG. 7 comprises two policy enforcement points A and B containing three rules respectively. If the network topology relationship states that the policy enforcement point A is after the policy enforcement point B, for the policy enforcement point A and B, when the destination of the received HTTPS traffic packet is (10.40.24.99), the policy enforcement point B only forwards the packet to the subsequent policy enforcement point A, and the policy enforcement point A only inspects the HTTPS traffic packet.

The packet inspection policy can be created and deployed according to the IP address, packet signature, security tags, or any identifier to identify a traffic packet.

Step 309: deploying the packet inspection policy to the policy enforcement point.

<Packet Inspection policy Adjustment Module>

Figure 4:
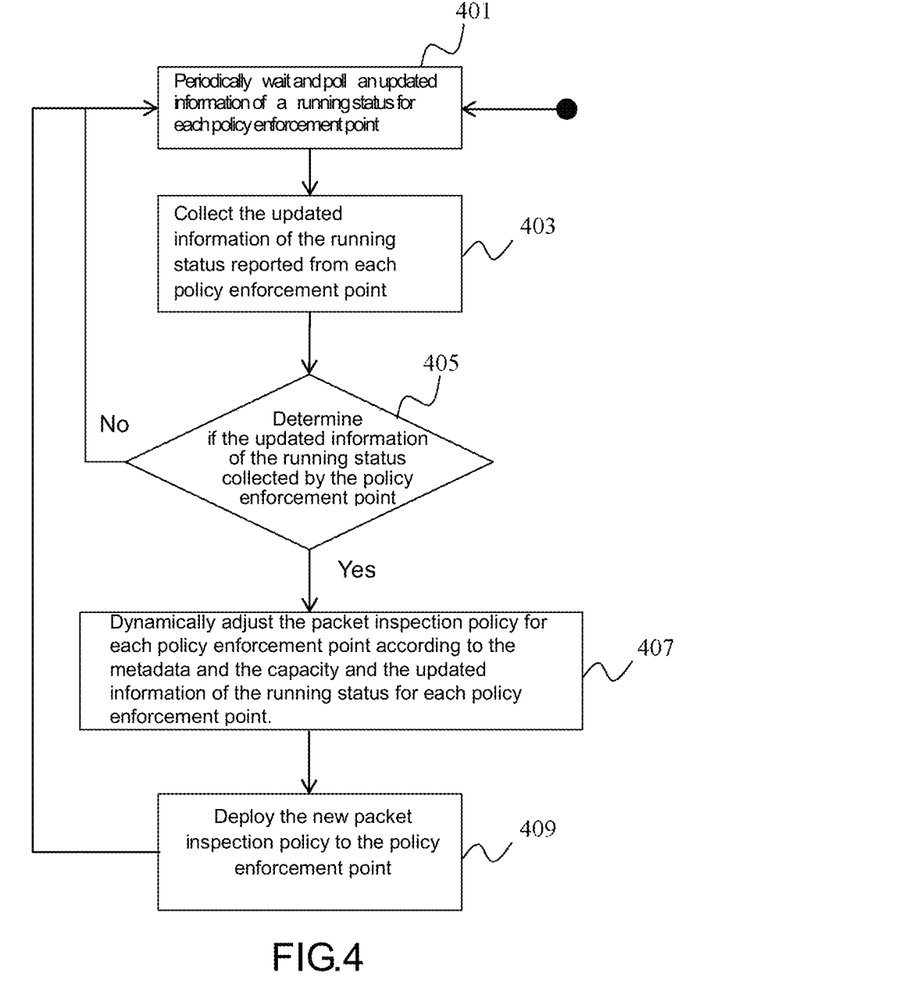
FIG. 4 is a flowchart showing a method of a packet inspection policy adjustment module according to an embodiment of the present invention.

FIG. 4 is a flowchart showing a method of a packet inspection policy adjustment module according to an embodiment of the present invention. The adjustment module comprises a program module and instructions for a centralized management system to dynamically adjust the packet inspection policy for each policy enforcement point according to the capability of each policy enforcement point, metadata, and running status of each policy enforcement point (e.g. the current load, and health information).

Step 401: periodically waiting and polling an updated information of a running status for each policy enforcement point through the centralized management system. The running status comprises the load and health information of the packet inspected by each policy enforcement point. The health information of the policy enforcement point may comprise the using state of disks, CPU, memory, and so on. More related information may be found within the IBM Security Network Intrusion Prevention System 4.6.1 documentation at IBM's Knowledge Center website.

Step 403: collecting the updated information of the running status reported from the policy enforcement point.

Step 405: determining if the updated information of the running status collected by the policy enforcement point reaches a threshold to trigger a mechanism of generating a new packet inspection policy to the policy enforcement point. For example, determining if a packet inspected by a specific security mechanism of a policy enforcement point reaches a specific threshold, such as HTTPS traffic packet. If yes, it is necessary to trigger an adjustment mechanism for balancing the load of each policy enforcement point. The related information about load balancing may be found within the Fusion Middleware High Availability Guide at Oracle's Help Center website.

Step 407: If a threshold is reached, the centralized management system dynamically adjusts packet inspection policies of each policy enforcement point according to the metadata and the running status (e.g. the current load and health information) of each policy enforcement point. The aforementioned metadata may comprise the capability of the policy enforcement point (e.g. a packet inspection capability, a processor capability for the policy enforcement point and a bandwidth), and the sequence related to other policy enforcement point or other metadata.

Step 409: deploying the newly added packet inspection policy to the policy enforcement point.

<Packet Security Tag Inspection Module>

To increase the overall performance of the network infrastructure, a security tag can be further added to the packet received in a policy enforcement point, so as to allow a following policy enforcement point to receive the packet and inspect the security tag of the packet and thus recognize which security mechanism has been inspected in the packet. By this way, the speed of packet inspection for the following policy enforcement point is accelerated. The security tag at least comprises a metadata, a checklist, and a hash value for preventing tampering of the packet.

Figure 6:
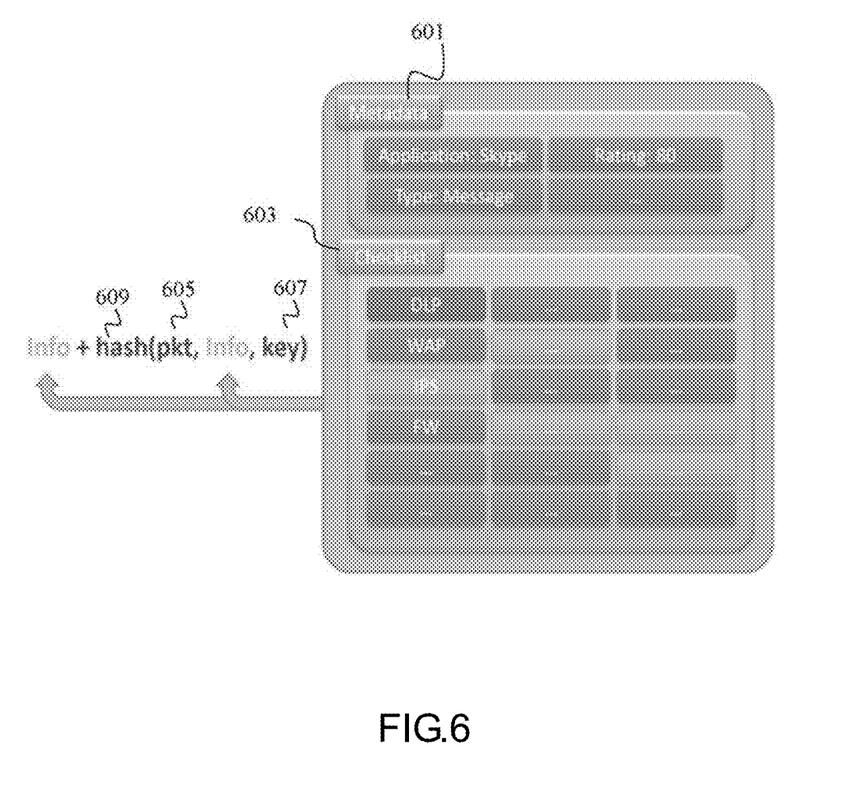
FIG. 6 illustrates security tags according to an embodiment.

As shown in FIG. 6, the metadata 601 indicates that the application in the packet is Skype, and the data type is message. In addition, other information may be added, such as the security level of a computer's policy enforcement point (e.g. Rating: 80). Also, the malicious level of the packet may be added.

The security tags 600 also show the record of inspections made on the route the packet sent. In the checklist 603 as shown in FIG. 6, the packet has been inspected by a security mechanism such as DLP, WAP, IPS, and FW.

To prevent the packet containing the security tag from being tampered, a hash value 609 used to prevent tampering may be added to the security tag. The hash value is the value produced by a packet 605, a shared key 607, and the data including the metadata 601 and the checklist 603.

Figure 5:
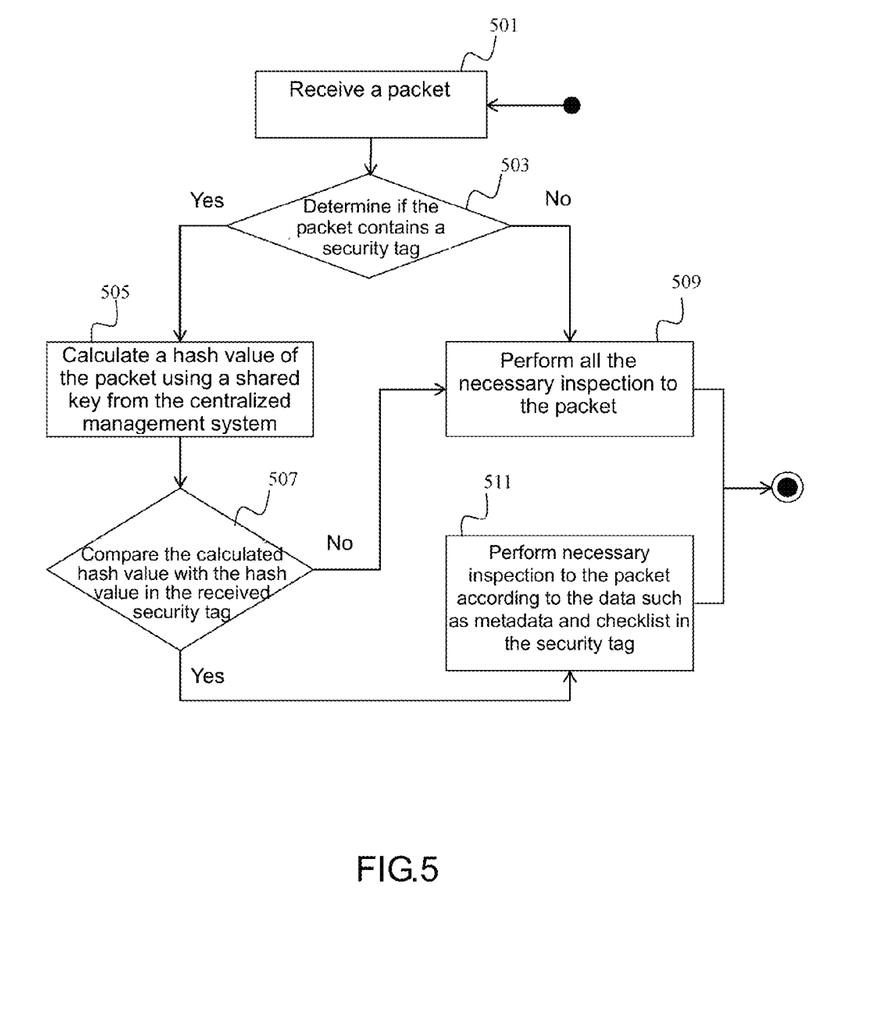
FIG. 5 is a flowchart showing a method of a packet security tags inspection module implemented by a policy enforcement point according to an embodiment of the present invention.

Through the security tag, the following policy enforcement point receiving the packet can inspect the security tag of the packet and thus recognize which security mechanism has been inspected in the packet. Therefore, the speed of packet inspection for the following policy enforcement point is accelerated. FIG. 5 is a flowchart showing a method of a packet security tags inspection module implemented by a policy enforcement point according to an embodiment of the present invention. The inspection module comprises a program module and instructions for inspecting security tags of a packet to increase the performance of the policy enforcement point.

Step 501: receiving a packet by a policy enforcement point.

Step 503: determining if the packet contains a security tag. FIG. 6 illustrates the security tag in a preferred embodiment.

Step 505: calculating a hash value of the packet using a shared key from the centralized management system if the security tags exist. The shared key is shared with all policy enforcement points having registered in the centralized management system in the network infrastructure.

Step 507: comparing the calculated hash value with the hash value contained in the received security tag.

Step 511: performing necessary inspection to the packet by the policy enforcement point according to the data, such as the metadata and checklist in the security tags, if the two hash values are identical. The same of the two values means that the received packet with the security tag have not been tampered, Step 509: performing all the necessary inspection to the packet by the policy enforcement point if the two hash values are not identical or the packet does not contain any security tag.

It should be noted that the packet security tag inspection module of the present invention is implemented by the security agents or security appliances. The module provides an alternative option which is not exclusively necessary in the present invention. The centralized management system is enabled without the module in the present invention.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

What is claimed is:

1. A method of generating a packet inspection policy for a policy enforcement point that enforces the packet inspection policy in a centralized management environment, the method comprising:
    updating data of a network topology for the policy enforcement point that enforces the packet inspection policy corresponding to a network infrastructure according to a metadata of the policy enforcement point, the metadata including a capability of the policy enforcement point that enforces the packet inspection policy;
    determining whether a specific capability exists within policy enforcement points other than the policy enforcement point that enforces the packet inspection policy, wherein the policy enforcement points are in network segments of the centralized management environment associated with the policy enforcement point that enforces the packet inspection policy;
    responsive to a determination that the specific capability fails to exist within the other policy enforcement points, generating the packet inspection policy for the policy enforcement point that enforces the packet inspection policy according to the data of the network topology and the capability of the policy enforcement point that enforces the packet inspection policy, wherein the packet inspection policy include the specific capability; and
    deploying the packet inspection policy to the policy enforcement point that enforces the packet inspection policy.

2. The method as claimed in claim 1, wherein the metadata further comprises a sequence related to other policy enforcement point that enforces the packet inspection policy for determining a position of the policy enforcement point that enforces the packet inspection policy as newly added in the network infrastructure, so as to update the data of the network topology for the policy enforcement point that enforces the packet inspection policy corresponding to the network infrastructure.

3. The method as claimed in claim 1, wherein the capability of the policy enforcement point that enforces the packet inspection policy comprises a packet inspection capability, a processor capability for the policy enforcement point that enforces the packet inspection policy, and a bandwidth.

4. The method as claimed in claim 3, wherein the packet inspection capability comprises a security protection technology including data leakage protection, secure sockets layer inspection, firewall, virus detection, malware detection, intrusion detection system (IDS) or intrusion prevention system (IPS).

5. The method as claimed in claim 1, further comprising:
    adjusting the packet inspection policy for the policy enforcement point that enforces the packet inspection policy in the centralized management environment by:
    periodically waiting and polling an updated information of a running status for the policy enforcement point that enforces the packet inspection policy;
    collecting the updated information of the running status reported from the policy enforcement point that enforces the packet inspection policy, the updated information of the running status comprising a load of a packet inspected by the policy enforcement point that enforces the packet inspection policy;
    determining whether the updated information of the running status collected by the policy enforcement point that enforces the packet inspection policy reaches a threshold; and
    dynamically adjusting the packet inspection policy for the policy enforcement point that enforces the packet inspection policy according to the metadata and the updated information of the running status for the policy enforcement point that enforces the packet inspection policy.

6. The method as claimed in claim 5, wherein the running status comprises health information including a status in use of a disk, CPU, or memory of the policy enforcement point that enforces the packet inspection policy.

7. The method as claimed in claim 5, wherein the packet inspected by the policy enforcement point that enforces the packet inspection policy comprises a security tag provided for a following policy enforcement point that enforces the packet inspection policy receiving the packet to inspect the security tag of the packet in order to accelerate the packet inspection for the following policy enforcement point that enforces the packet inspection policy.

8. The method as claimed in claim 7, wherein the security tag at least comprises a metadata, a checklist, and a hash value for preventing tampering of the packet.

9. A computer program product comprising a non-transitory computer-readable storage medium having a computer readable program for generating a packet inspection policy for a policy enforcement point that enforces the packet inspection policy in a centralized management environment stored therein, wherein the computer readable program, when executed on a computing device, causes the computing device to:
    update data of a network topology for the policy enforcement point that enforces the packet inspection policy corresponding to a network infrastructure according to a metadata of the policy enforcement point that enforces the packet inspection policy, the metadata including a capability of the policy enforcement point that enforces the packet inspection policy;
    determine whether a specific capability exists within policy enforcement points other than the policy enforcement point that enforces the packet inspection policy, wherein the policy enforcement points are in network segments of the centralized management environment associated with the policy enforcement point that enforces the packet inspection policy;
    responsive to a determination that the specific capability fails to exist within the other policy enforcement points, generate the packet inspection policy for the policy enforcement point that enforces the packet inspection policy according to the data of the network topology and the capability of the policy enforcement point that enforces the packet inspection policy, wherein the packet inspection policy include the specific capability; and deploy the packet inspection policy to the policy enforcement point that enforces the packet inspection policy.

10. The computer program product as claimed in claim 9, wherein the metadata further comprises a sequence related to other policy enforcement point that enforces the packet inspection policy for determining a position of the policy enforcement point that enforces the packet inspection policy as newly added in the network infrastructure, so as to update the data of the network topology for the policy enforcement point that enforces the packet inspection policy corresponding to the network infrastructure.

11. The computer program product as claimed in claim 9, wherein the capability of the policy enforcement point that enforces the packet inspection policy comprises a packet inspection capability, a processor capability for the policy enforcement point that enforces the packet inspection policy and a bandwidth, wherein the packet inspection capability comprises a security protection technology including data leakage protection, secure sockets layer inspection, firewall, virus detection, malware detection, intrusion detection system (IDS) or intrusion prevention system (IPS).

12. The computer program product as claimed in claim 9, wherein the computer readable program further causes the computing device to:

adjust the packet inspection policy for the policy enforcement point that enforces the packet inspection policy in the centralized management environment by:
periodically waiting and polling an updated information of a running status for the policy enforcement point that enforces the packet inspection policy;
collecting the updated information of the running status reported from the policy enforcement point that enforces the packet inspection policy, the updated information of the running status comprising a load of a packet inspected by the policy enforcement point that enforces the packet inspection policy;
determining whether the updated information of the running status collected by the policy enforcement point that enforces the packet inspection policy, reaches a threshold; and
dynamically adjusting the packet inspection policy for the policy enforcement point that enforces the packet inspection policy according to the metadata and the updated information of the running status for the policy enforcement point that enforces the packet inspection policy.

13. The computer program product as claimed in claim 12, wherein the running status comprises health information including a status in use of a disk, CPU, or memory of the policy enforcement point that enforces the packet inspection policy.

14. The computer program product as claimed in claim 12, wherein the packet inspected by the policy enforcement point that enforces the packet inspection policy comprises a security tag provided for a following policy enforcement point that enforces the packet inspection policy receiving the packet to inspect the security tag of the packet in order to accelerate the packet inspection for the following policy enforcement point that enforces the packet inspection policy and wherein the security tag at least comprises a metadata, a checklist, and a hash value for preventing tampering of the packet.

15. An information appliance for generating a packet inspection policy for a policy enforcement point that enforces the packet inspection policy in a centralized management environment, comprising:

a bus;
a memory connected to the bus, wherein the memory comprises a set of instructions; and
a processing unit in connection to the bus, wherein the processing unit executes the set of instructions to:
update data of a network topology for the policy enforcement point that enforces the packet inspection policy corresponding to a network infrastructure according to a metadata of the policy enforcement point that enforces the packet inspection policy, the metadata including a capability of the policy enforcement point that enforces the packet inspection policy;
determine whether a specific capability exists within policy enforcement points other than the policy enforcement point that enforces the packet inspection policy, wherein the policy enforcement points are in network segments of the centralized management environment associated with the policy enforcement point that enforces the packet inspection policy;
responsive to a determination that the specific capability fails to exist within the other policy enforcement points, generate the packet inspection policy for the policy enforcement point that enforces the packet inspection policy according to the data of the network topology and the capability of the policy enforcement point that enforces the packet inspection policy, wherein the packet inspection policy include the specific capability; and
deploy the packet inspection policy to the policy enforcement point that enforces the packet inspection policy.

16. The information appliance as claimed in claim 15, wherein the metadata further comprises a sequence related to other policy enforcement point that enforces the packet inspection policy for determining a position of the policy enforcement point that enforces the packet inspection policy as newly added in the network infrastructure, so as to update the data of the network topology for the policy enforcement point that enforces the packet inspection policy corresponding to the network infrastructure.

17. The information appliance as claimed in claim 15, wherein the capability of the policy enforcement point that enforces the packet inspection policy comprises a packet inspection capability, a processor capability for the policy enforcement point that enforces the packet inspection policy and a bandwidth, wherein the packet inspection capability comprises a security protection technology including data leakage protection, secure sockets layer inspection, firewall, virus detection, malware detection, intrusion detection system (IDS) or intrusion prevention system (IPS).

18. The information appliance as claimed in claim 15, wherein the instructions further cause the processing unit to:
adjust the packet inspection policy for the policy enforcement point that enforces the packet inspection policy in the centralized management environment by:
periodically waiting and polling an updated information of a running status for the policy enforcement point that enforces the packet inspection policy;
collecting the updated information of the running status reported from the policy enforcement point that enforces the packet inspection policy, the updated information of the running status comprising a load of a packet inspected by the policy enforcement point that enforces the packet inspection policy;

determining whether the updated information of the running status collected by the policy enforcement point that enforces the packet inspection policy reaches a threshold; and dynamically adjusting the packet inspection policy for the policy enforcement point that enforces the packet inspection policy according to the metadata and the updated information of the running status for the policy enforcement point that enforces the packet inspection policy.

19. The information appliance as claimed in claim 18, wherein the running status comprises health information including a status in use of a disk, CPU, or memory of the policy enforcement point that enforces the packet inspection policy.

20. The information appliance as claimed in claim 18, wherein the packet inspected by the policy enforcement point that enforces the packet inspection policy comprises a security tag provided for a following policy enforcement point that enforces the packet inspection policy receiving the packet to inspect the security tag of the packet in order to accelerate the packet inspection for the following policy enforcement point that enforces the packet inspection policy and wherein the security tag at least comprises a metadata, a checklist, and a hash value for preventing tampering of the packet.

* * * * *